US005833101A

United States Patent [19]
Watkins

[11] Patent Number: 5,833,101
[45] Date of Patent: Nov. 10, 1998

[54] CAMERA MOUNT

[76] Inventor: D. Scott Watkins, 470 Elgaen Ct., Roswell, Ga. 30075

[21] Appl. No.: 919,298

[22] Filed: Aug. 28, 1997

[51] Int. Cl.$^6$ ....................................................... B60R 7/04
[52] U.S. Cl. .......................... 224/275; 224/550; 224/553; 224/554; 224/564; 224/572; 224/908; 224/929; 248/177.1; 248/291.1; 248/187.1; 396/419; 396/428
[58] Field of Search ...................................... 224/275, 929, 224/539, 545, 547, 548, 550, 551, 553, 554, 555, 558, 564, 572, 908; 396/419, 428; 248/177.1, 179.1, 183.2, 298.1, 291.1, 187.1

[56] References Cited

U.S. PATENT DOCUMENTS

| | | | |
|---|---|---|---|
| 765,980 | 7/1904 | Mercier | 396/419 |
| 2,481,717 | 9/1949 | Blair | 248/183.2 |
| 2,614,471 | 10/1952 | Markowitz | 95/86 |
| 2,794,612 | 6/1957 | Clifton | 396/428 |
| 3,515,472 | 6/1970 | Schwitzgebel | 352/132 |
| 3,545,710 | 12/1970 | Mooney | 248/183.2 |
| 3,598,355 | 8/1971 | English | 396/428 |
| 3,752,376 | 8/1973 | Shelton et al. | |
| 4,029,246 | 6/1977 | Woodruff | |
| 4,645,320 | 2/1987 | Muelling | 354/81 |
| 4,974,807 | 12/1990 | Moineau | 224/275 |
| 5,260,731 | 11/1993 | Baker, Jr. | 354/81 |
| 5,366,194 | 11/1994 | Finney | 248/218.4 |

FOREIGN PATENT DOCUMENTS

| | | | |
|---|---|---|---|
| 59-359011939 A | 1/1984 | Japan | 224/551 |
| 2238993 | 6/1991 | United Kingdom | 224/551 |

OTHER PUBLICATIONS

B&H advertisement showing 3000 Pro Camera Stabilization System and Vehicle Camera–Mount devices.
Wolfe Camera Catalog, p. 46, Clamp–Pod device.
"The Jo Mount", p. 46, The PI Catalog, Thomas Investigative Publications, Austin, TX 78764, Winter 1997–1998.
Model 700F Eagleye® camera system brochure, Eagleye Technologies, Inc., Rome, Georgia (undated).
Eagleye® System Model 700 System Basic Features brochure, Eagleye Technologies, Inc. Rome, Georgia (undated).
Model 700 System Specifications brochure, (2 pages), Eagleye Technologies, Inc., Rome, Georgia (undated).
Eagleye Dispatch, vol. 2, Summer 1995, Eagleye Technologies, Inc., Rome Georgia.

*Primary Examiner*—Allan N. Shoap
*Assistant Examiner*—Gregory M. Vidavich
*Attorney, Agent, or Firm*—Kennedy, Davis & Kennedy

[57] ABSTRACT

A mount for use in an automobile to support a camera for recording images during operation of the automobile. The camera mount comprises an elongate member extending between and rigidly connected to the headrest supports in the seat of the car. A camera mounts to a pivotable support connected to the member with bolts extending through an elongate slot, whereby the camera is selectively positioned along the member. The elongate member connects to the headrest supports with j-bolts that are received through a pair of second slots in the elongate member. The j-bolts extend around the headrest supports and a nut threaded on the j-bolt secures the member to the headrest supports. An alternate embodiment is disclosed for vehicles which do not have separate headrest supports. A method of mounting a camera in an automobile is disclosed.

37 Claims, 3 Drawing Sheets ated in FIG. 1 to the headrest support of a seat in an
CAMERA MOUNT

TECHNICAL FIELD

The present invention relates to mounts for cameras. More particularly, the present invention relates to a camera mount for use in vehicles.

BACKGROUND OF THE INVENTION

Movie cameras, and most recently, video tape cameras and recorders, have facilitated the recording and display of action through movies and television. In order to record action scenes, cameras have been mounted on a variety of devices. These devices include stationery mounts for recording movement of objects passing before the camera, as well as mounts which are positioned in moving objects. The ability to position a camera in a variety of locations permits a film director to record a number of different view points from which to observe the action.

Moving vehicles are one type of object which are used in movies and in sports such as automobile racing. Cameras have been mounted on stationery supports for recording motion of automobiles in action scenes. For example, movies involving car chases typically present exterior views of the automobiles in the chase. However, other perspectives of the automobile chase enhance the communication of the action. For example, a camera mounted inside the car shows the perspective view of the driver during the chase scene. Similarly, automobiles used in racing can be shown from a number of perspectives including that of spectators and the drivers. Video cameras have also recently been installed in police cars for recording real time events, such as traffic stops, high speed chases, and the like.

Various devices have been developed for mounting cameras in cars in order to provide perspective views of the action involving the car. For example, a U-shaped bracket has been provided for mounting a video camera to an interior roof of a car near the windshield, whereby the camera view is forward through the windshield in order to provide a record of traffic stops, automobile chases, and the like. Other camera mounts have been used to secure video or television cameras within automobiles, such as race cars to provide the drivers perspective during an automobile race being broadcasted on television. One known device for mounting a camera in a car maintains the camera level with respect to the roads surface regardless of acceleration or gravitational forces. The camera is supported on a pendulum suspended from a gimble and constrained with spring and damping elements which match the vehicle suspension system in order to produce equal and opposite rotations of the pendulum in response to the movements of the vehicle.

Other devices are less complicated. One such device mounts a camera in a protective box which attaches to the rear deck of the vehicle near the back window. Telescoping members connect the box to the rear deck. Coil springs absorb shock in order to dampen vibrations communicated to the camera. Another device provides a channel member with a depending plate at one end. The plate is received in a slot of an upper edge of a car seat which normally receives a tongue or support member of a headrest. A distal end of the channel rests on top of the dashboard of the vehicle. A camera mounts with a bolt through an opening in the channel. An elastic hold-down and stabilizing cord is used to secure the distal end of the channel to the dashboard.

While these devices have generally functioned to support a camera within a car, there are drawbacks to their use. Mounting the camera on a rear deck of a car does not satisfactorily show dashboard information which is useful and important during automobile races. Also this perspective view differs from that seen by the driver. On the other hand, placing the camera closer to the windshield using the bracket which engages the head rest channel may have the camera to far forward to show the dashboard of the car. Also, this bracket is susceptible to vibration as the distal end is not adequately secured. Further, this camera mount occupies one of the head rests and takes the space otherwise occupied by a passenger.

Accordingly, there is a need in the art for an improved camera mount which rigidly secures to an automobile for use in holding a camera for recording images of motion from the automobile. It is to such that the present invention is directed.

SUMMARY OF THE INVENTION

The camera mount of the present invention meets the needs in the art by providing an elongated rigid member which connects to headrest supports in a seat of an automobile. The elongated member defines a camera support surface having an elongated first slot which extends along a line substantially parallel to a longitudinal axis of the member. The member also defines a bracket mounting surface having at least two pairs of second slots coaxially aligned therein and spaced apart. The second slots extend along a second line substantially parallel to the longitudinal axis of the member. A support block defines at least one threaded bore for receiving a bolt that extends through the first slot and into the threaded bore, whereby the support block is selectively positioned along the first slot and secured to the camera support surface. A pivot plate pivotally connects to the support block and can be positioned in a selected angle relative the support block, whereby a camera mounted to the pivot plate can be selectively tilted for adjusting the angle of the camera view for recording images. Brackets received through the second slots rigidly connect the elongated member to the headrest supports in a seat of the automobile in which the camera mount is installed.

Objects, advantages and features of the present invention will become apparent from a reading of the following detailed description of the invention and claims in view of the appended drawings.

DETAILED DESCRIPTION OF THE PREFERRED EMBODIMENT

Figure 1:
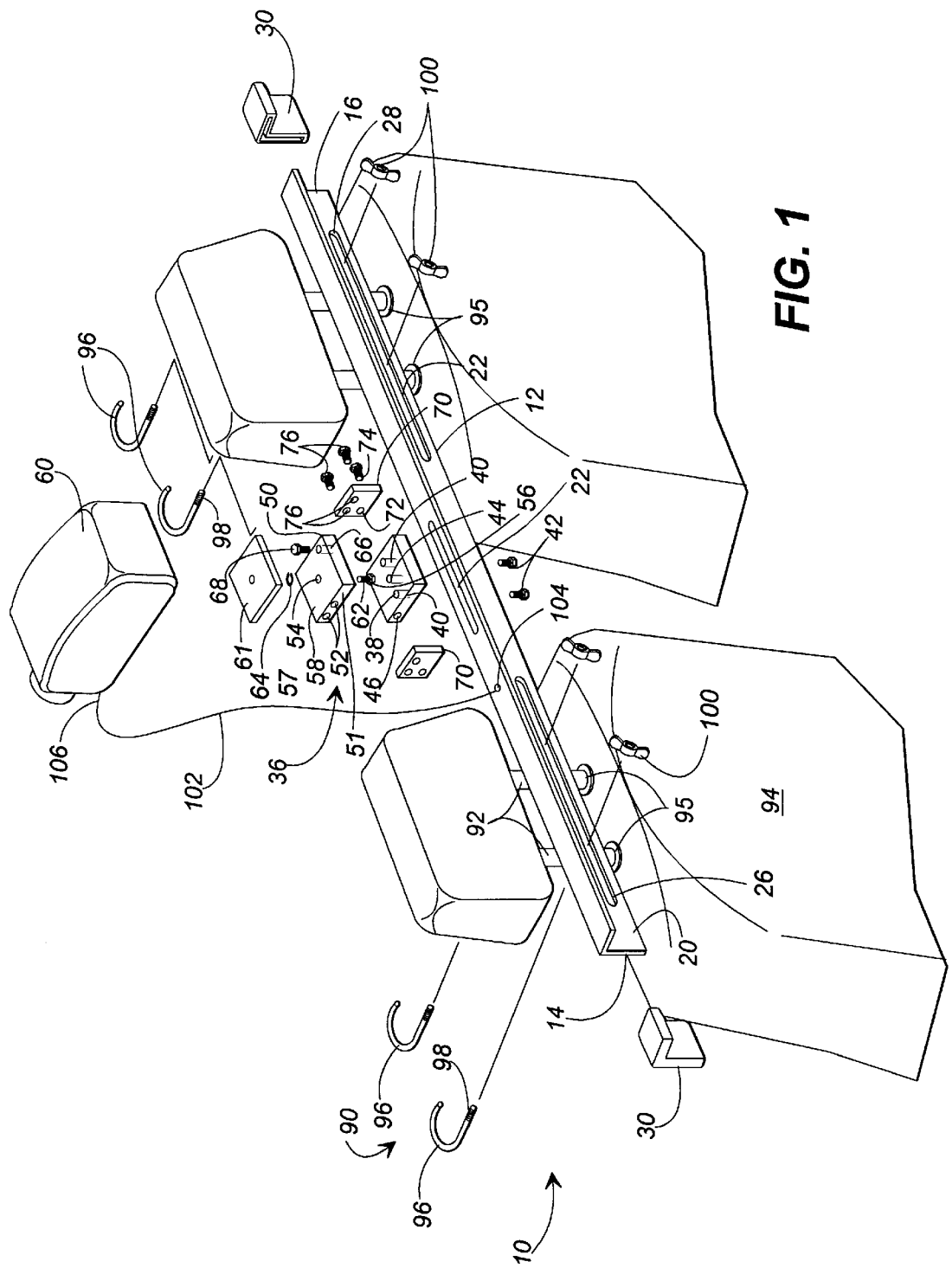
FIG. 1 is a perspective view of a camera mount bar according to the present invention attached to a seat in an automobile.

Referring now in more detail to the drawings in which like parts have like identifiers, FIG. 1 illustrates in perspective view a camera mount bar 10 for use in automobiles, according to the present invention. The camera mount bar 10 comprises an elongate rigid angle member 12 having distal ends 14 and 16. The angle member 12 defines a camera mount surface 18 and a bracket mounting surface 20. The camera mount surface 18 defines an elongated slot 22 which is substantially parallel to a longitudinal axis of the member 12. The slot 22 is preferably positioned central between the distal ends 14 and 16. In an alternate embodiment, the elongate member 12 is a U-shaped channel. In another embodiment, the elongate member 12 is a rectangular tube.

The bracket mounting surface 20 defines a pair of elongated slots 26, 28. The slots 26, 28 are spaced apart and coaxially aligned. The slots are substantially parallel to the longitudinal axis of the elongate member 12. An alternate embodiment (not illustrated) has two pairs of slots 26, 28. The slots 26, 28 are coaxially aligned and the pair of slots 26 are spaced apart in an end portion of the elongate member 12 and the pair of slots 28 are spaced apart in the longitudinally distal end portion thereof. Elastic boots 30 are received on the distal ends 14 and 16.

The elongate member 12 receives a camera mount, generally designated 36. The camera mount 36 comprises a support block 38 having at least one tapped bore 40 which receives a bolt 42 extending through the slot 22 of the elongate member 12 to secure the support block to the elongate member. In the illustrated embodiment, the support block 38 defines a pair of the tapped bores 40, for rigidly connecting the support block 38 to the camera mount surface 18. The support block 38 defines a hole 44 which in the illustrated embodiment is centrally located, for a purpose discussed below. Opposing side faces of the support block 38 define lateral tapped bores 46.

A pivot plate 50 pivotally connects to the support block 38, as discussed below. The pivot plate 50 and the support block 38 pivot relative each other in clam-shell fashion. A first side portion 51 of the pivot plate 50 defines a pair of lateral tapped bores 52 on opposing sides of the pivot plate. A hole 54 is defined in a central portion of the pivot plate 50, for alignment with the hole 44 in the support block 38, for a purpose discussed below. The hole 54 is countersunk on an entry surface for a bolt 56. The hole 54 is also countersunk on the opposing bearing surface 58 that supports a camera 60. The hole 54 is countersunk on the entry surface so the head of the bolt 56 is received within the block to define a smoothly continuous plane on the entry surface. The bolt 56 is received through the hole 54. The bolt 56 defines a groove 62 in a portion of the bolt which extends above the bearing surface 58. A C-ring 64 snaps into the groove 62 to secure the bolt 56 in the hole 54. The countersunk bore in the bearing surface 58 permits the C-ring to be recessed relative to the plane of the bearing surface 58. A second side portion 57 opposite the first side portion 55 defines a hole 66 tapped through the pivot plate 50. The hole 66 receives a threaded bolt 68.

A pair of pivot blocks 70 pivotally connect the pivot plate 50 to the support block 38. The pivot blocks have a first bore 72 which receives a bolt 74. The bore 72 aligns with one of the tapped bores 46 in the support block 38. The pivot block 70 also defines a pair of second bores 76 which receive bolts 78. The pair of bores 76 align with the pair of tapped bores 52 in the pivot plate 50.

A bracket generally 90 connects the elongate member 12 to headrest supports 92 in a seat back 94 of an automobile. The headrest supports 92 are conventionally received in slots 95 in the seat back 94. In the illustrated embodiment, the bracket comprises a J-hook 96 having a distal end 97 and a threaded end 98. (An alternate embodiment of the bracket 90 is discussed below.) The threaded end 98 of the J-hook 96 extends through the respective slot 26 and 28 and receives a wing nut 100 for securing the J-hook to the elongate member 12. The distal end 97 of the J-hook likewise extends through the respective elongate slot 26, 28, whereby the J-hook 96 enwraps the headrest support 92. The wing nut 100 is tightened on the threaded end 98 in order to rigidly secure the J-hook 96 around the headrest support 92 and thereby rigidly connect the elongate member 12 to the headrest supports 92.

One embodiment of the camera mount bar 10 includes a strap 102 that connects at a first end 104 to the elongate member 12. A free second end 106 connects to a connector on the video camera 60.

The camera mount 36 is assembled by bolting the support block 38 to the pivot blocks 70. The tapped bore 46 in a support block 38 aligns with the bore 72 in the pivot block 70. The bolt 74 engages the tapped bore 46 and connects the pivot block 70 to the support block 38. The bolt 56 is inserted in the hole 54 of the pivot plate 50. The C-ring 64 engages the groove 62 to secure the bolt 56 in the hole 54. The pivot plate 50 is then connected to the pivot blocks 70 by engaging the bolts 78 in the aligned pairs of bores 76 and tapped bores 52. The camera mount assembly 36 is then connected to the camera mount surface 18. The bolts 42 extend through the slot 22 into the tapped bores 40 of the support block 38. The camera mount 36 is slidingly positioned along the slot 22 and the bolts 42 tightened to rigidly connect the camera mount to the camera mount surface of the elongate member 12.

The camera mount bar 10 is then attached to the seat backs 94 in an automobile. The J-hooks 96 extend through the respective slots 26, 28 and enwrap the headrest supports 92 as discussed above. The wing nuts 100 threadably engage the threaded ends 98 in order to rigidly secure the J-hooks around the headrest supports, whereby the camera mount bar 10 is rigidly connected to the seat back 94. The slots 26, 28 facilitate positioning the camera mount bar 10 in different automobiles, including compacts and larger automobiles. Also, the camera mount bar 10 connects to bucket seats as well as bench seats.

The camera 60 is connected to the camera mount 36 by threading the bolt 56 into a tapped bore in the camera 60. An adjuster, such as a screw driver extends through the aligned hole 44 in order to turn the bolt 56. It may be appreciated that a resilient pad 61 is gainfully positioned between the camera 60 and the bearing surface 58 of the pivot plate 50, for dampening vibrations. In the embodiment having the strap 102, the second end 106 is connected to the camera 60.

Conventionally, seat backs 94 are disposed at a angle, whereby the headrest supports 92 are disposed at an obtuse angle relative to the chassis of the automobile. The camera mount bar 10 accommodates this by permitting the pivot plate 50 to adjust the tilt of the camera 60 for a straight-on shot. The bolt 68 enters the tapped bore 66. The leading end of the bolt 68 bears against the surface of the support block 38 in order to tilt the pivot plate 50 to an obtuse angle with respect to the support block 38, whereby the camera 60 can be positioned for a straight-on view through the windshield of the automobile. Further, the camera 60 is readily disposed at an angle, such as towards the driver of the passenger, or aimed outwardly of the passenger window or rearwardly through the back window. The pivot plate 50 is locked in the selected position by tightening the bolts 74.

The camera mount 36 can be selectively positioned by sliding the camera mount 36 along the slot 22. In this way, the camera 60 can be positioned closer to the driver in order to record the instrumentation displayed on the instrument panel of the automobile. Alternatively, the camera 60 can be positioned remote from the driver in order to provide a passenger's view of the operation of the motor vehicle. Further, the elongate slots 26, 28 facilitate connecting the camera mount 36 in a selected position whereby a distal end 16 of the camera mount bar 10 extends outwardly of a passenger window in the automobile. A second slot (not illustrated) defined in the camera mount surface 18 in the distal end portion of the camera mount bar 10 facilitates mounting the camera 60 outwardly of the automobile.

Figure 2:
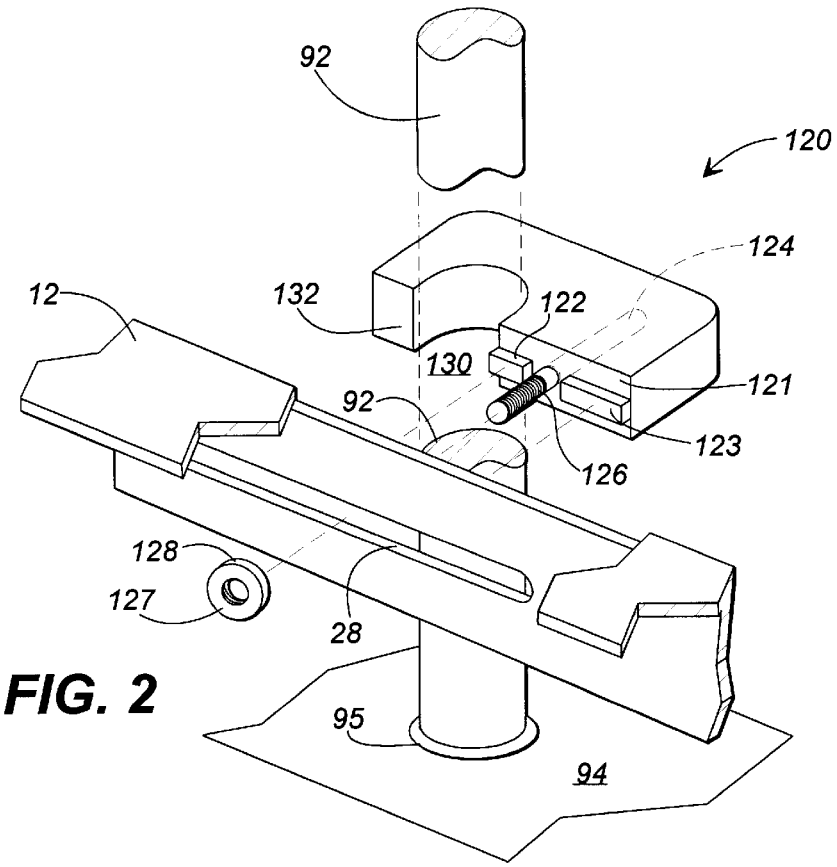
FIG. 2 is a perspective view of an alternate embodiment of the bracket for connecting the camera mount bar illustrated in FIG. 1 to the headrest support of a seat in an automobile.

FIG. 2 is a perspective view of a preferred embodiment of the bracket for securing the rigid angle member 12 to the headrest supports 92. A bracket 120 comprises a block having a face 121 which abuts the face of the bracket mounting surface 20. A pair of lands 122, 123 project from the face 121. The lands are sized to extend through the slots 26, 28 in the member 12. The block 120 also defines a bore 124 for receiving and securing a threaded connector 126 which also extends through the respective slots 26, 28. A fastener 127 threadingly engages the connector 126 to secure the block 120 to the member 12. In the illustrated embodiment, the fastener 127 has a knurled surface 128 for grasping and rotating by hand. A notch 130 is defined in the block 120 for receiving the headrest support 92 (shown in phantom line). A distal end 132 of the block 120 defines a J-hook for substantially encircling the headrest support 92 within the notch 130.

In use, the elongate member 12 is positioned against the headrest supports 92 as illustrated in FIG. 1. The bracket 120 is positioned against the mounting surface 20 with the headrest support 92 entrapped within the notch 130. The lands 122, 123 and the connector 126 extend through the respective slot 26, 28. The fastener 127 threads onto the connector 126. The fastener 127 is tightened to rigidly connect the block 120 to the angle member 12 and thereby rigidly connect the camera mount bar 10 to the headrest supports 92.

Figure 3:
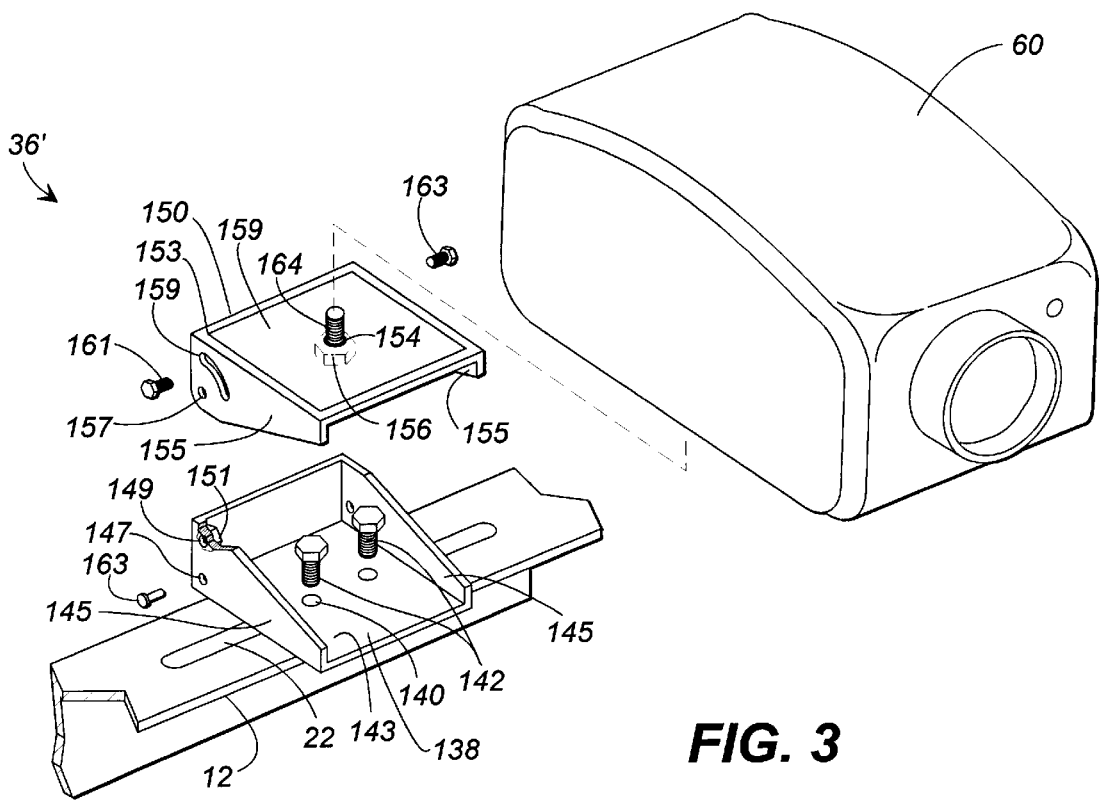
FIG. 3 is a perspective view of a preferred embodiment of the camera mount according to the present invention.

FIG. 3 is a perspective view of a preferred embodiment of the camera mount 36'. In this embodiment, the camera mount also forms a pivotable clam-shell structure with a support block 138 and a pivot plate 150. At least one bore 140 which receives a bolt 142 that extends through the slot 22 of the elongate member 12, for securing the support block to the elongate member. In a preferred embodiment, a pair of bores 140 and bolts 142 cooperatively connect the support block 138 to the support surface 18. The support block 138 comprises a metal plate folded to define a base 143 and a pair of sidewalls 145 and having a broad U-shaped appearance in cross-sectional view. Each sidewall 145 defines an opening 147. At least one of the sidewalls 145 also defines a second opening 149 to which a self-clinching nut 151 is secured on an inner face, for a purpose discussed below.

The pivot plate 150 pivotally connects to the support block 138, as discussed below, so that the block and the plate pivot open and closed in a clam-shell manner. The pivot plate 150 defines a top surface 153 and a pair of sidewalls 155 having a broad U-shaped appearance in cross-sectional view. The sides 155 each define an opening 157 which align with the respective openings 147 in the support block 138. At least one of the sides 155 defines an arcuate slot 159 which aligns with the opening 149 in the support block 138. A threaded connector 161 is received through the slot 159 and into the nut 151 for securing the pivot plate 150 at a selected angle relative to the elongate member 12. A hole 154 is defined in the upper surface of the pivot plate 150 and receives the bolt 156 for connecting to the video camera 60. The head of the bolt 156 is rotated by the reaching into the cavity between the support block 138 and the pivot plate 150. A resilient pad 159 is preferably received on the pivot plate 150 to dampen vibration communicated to the video camera 60. In a preferred embodiment, the bolt 156 is held in the hole 154 by the C-ring 164 received in the groove in the bolt, as discussed above (not illustrated in FIG. 3).

The support block 138 connects to the pivot plate by aligning the sidewalls 155 outwardly of the sidewalls 145 and inserting a pin 163 through the aligned holes 157 and 147 on each side of the camera mount 36. The pin 163 preferably is a nylon button with a stem and a knob at a distal end. The threaded fastener 161 passes through the arcuate slot 159 and into the nut 151 to secure the pivot plate 150 at a selected angle relative to the elongate member 12. The bolts 142 extend through the openings 140 and engage nuts to secure the support plate 138 at a selected position along the slot 22 in the elongate member 12.

Figure 4:
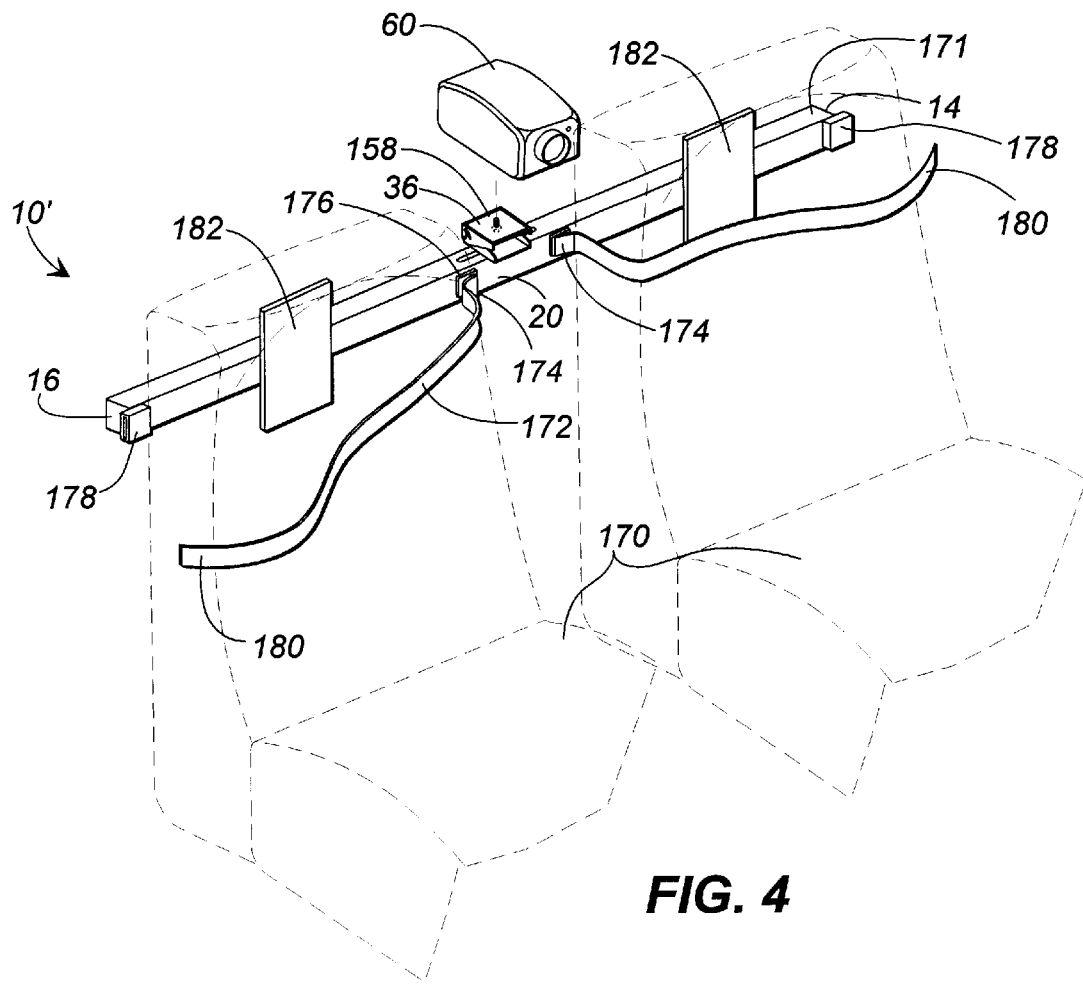
FIG. 4 is a perspective view of an alternate embodiment of the camera mount bar for use in automobiles which do not have headrest supports in the seats.

FIG. 4 is a perspective view of an alternate embodiment of the camera mount bar 10' for installation in automobiles which do not have separate, extendable headrests with supports 92. In the illustrated embodiment, two bucket seats 170 are illustrated in phantom to show the environment of the alternate embodiment. An elongate rigid member 171 includes the elongate slot 22 in the camera mounting surface 18. However, the support surface 20 does not include the elongate slots 26 and 28. Rather, a pair of elongate flexible straps 172 are attached at a first end 174 to the support surface 20. In the illustrated embodiment, the first end 174 is attached intermediate the longitudinal ends 14 and 16 of the elongate member 171. The pair of ends 174 are preferably spaced apart, although that is not necessary. The strap 172 is preferably a strong woven fabric, such as a seat belt material. The first end 174 loops through an opening in a metal plate 176 and is sewn together to securely attach the end to the metal plate. The metal plate 176 is rigidly connected to the support surface 20 with rivets, bolts, or other fasteners. A pair of buckles 178 rigidly attach to the support surface 20 near the longitudinal distal ends 14 and 16 of the elongate member 12. The buckles 178 are adapted to receive and securely engage the strap 172 by passing a free end 180 through the buckle. The camera mount 36', such as the embodiment illustrated in FIG. 3, is connected to the slot 22 of the elongate member 12.

A pair of plates 182 connect to the face of the support surface 20 in spaced-apart relation. In the illustrated embodiment, the plates 182 are rectangular metal plates oriented to have a longitudinal axis substantially perpendicular to a longitudinal axis of the elongate member 171. The plates 182 bear forcibly against the back of the seat 170 in the car in which the alternate embodiment camera mount 10 is installed. The elongate member 171 extends between the seats 170 on the backside of the seats. The member 171 is held in position as the pair of straps 172 are looped around the seats. The free end 180 is received through the buckle 172 and the excess length of the strap 172 is pulled in order to cinch the strap tightly about the seat 170. The buckle 178 holds the strap 172 in a tightly cinched manner, whereby the elongate member 171 is securely held to the seats 170. The plates 182 bear against the back of the seats. The camera mount 36 is attached as discussed above to the elongate slot 22 in the elongate member 12. The camera 60 is attached to the camera mount 36, as discussed above.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. A camera mount for use in an automobile to support a camera for recording images of objects from the automobile, comprising:

an elongated rigid member defining a camera support surface having an elongated first slot therein, said first slot extending along a line substantially parallel to a longitudinal axis of the member and a bracket mounting surface defining at least two second slots coaxially aligned therein and spaced apart, said second slots extending along a second line substantially parallel to the longitudinal axis of the member;

a support block defining at least one threaded bore and rigidly connected to the camera support surface by at least one bolt extending through the first slot and into the threaded bore, whereby the support block is selectively positioned along the first slot;

a pivot plate pivotally connected to the support block;

means for securing a camera to the pivot plate;

means for locking the pivot plate in a selected angle relative the support block, whereby the camera is selectively tilted for adjusting the angle of the camera view for recording images; and brackets respectively received through the second slots for rigidly connecting the elongated member to headrest supports in the back of a seat of the automobile in which the camera mount is installed.

2. The camera mount as recited in claim 1, wherein the means for securing a camera comprises a threaded bolt; and wherein the pivot plate defines a hole for receiving the threaded bolt.

3. The camera mount as recited in claim 2, wherein the threaded bolt defines an annular groove around a perimeter surface of the threaded bolt; and further comprising a c-ring secured to the groove after the threaded bolt is received in the hole in the pivot plate, whereby the c-ring prevents the threaded bolt from being removed from the pivot plate.

4. The camera mount as recited in claim 3, wherein the support block defines a second hole in substantial alignment with the hole in the pivot plate, for receiving an adjuster for rotating the threaded bolt in order to connect the camera thereto.

5. The camera mount as recited in claim 1, wherein the rigid member is an angle member.

6. The camera mount as recited in claim 1, further comprising means for adjusting the angle of pivot of the pivot plate.

7. The camera mount as recited in claim 6, wherein the means for adjusting comprises:

the pivot plate defining a threaded bore;

a bolt received in the threaded bore, whereby the bolt, being screwed through the threaded bore, bears against an upper surface of the support block and thereby causes the angle between the pivot plate and the support block to change.

8. The camera mount as recited in claim 1, wherein the support block is U-shaped in front plan view; and the pivot plate is U-shaped in front plan view, and disposed in inverted position matingly receives the support block, which support block and pivot plate are pivotally joined together for pivoting the pivot plate relative to the support block, where the angle of the camera view is selectively adjustable.

9. The camera mount as recited in claim 8, wherein the pivot plate defines at least one arcuate slot for receiving a fastener therethrough; and wherein the support block further includes a securing member for receiving the fastener, whereby the pivot plate is pivoted as guided by the fastener in the arcuate slot to a selected angle and secured thereat by tightening the fastener in the securing member.

10. The camera mount as recited in claim 1, wherein the brackets each comprise a j-bolt having a threaded end which extends through one of the second slots, the j-bolt extending around the headrest support to secure the elongated rigid member to the headrest support when a fastener is secured to the threaded end.

11. The camera mount as recited in claim 1, wherein the brackets each comprise a block defining a notch for receiving a portion of a headrest support and having a threaded connector extending from the block for being received through a respective one of the second slots; and a fastener for being received on the connector whereby the bracket is secured to the elongate rigid member while engaging the headrest support.

12. The camera mount as recited in claim 11, wherein the block defines a land portion which is received within the respective second slot.

13. The camera mount as recited in claim 1, further comprising a resilient pad received on the pivot plate for cushioning the connection between the pivot plate and the camera.

14. A camera mount for use in an automobile to support a camera for recording images of objects from the automobile, comprising:

an elongated rigid angle member defining a camera support surface having an elongated first slot therein, said first slot extending along a line substantially parallel to a longitudinal axis of the member and a bracket mounting surface defining at least two second slots coaxially aligned therein and spaced apart, said second slots extending along a second line substantially parallel to the longitudinal axis of the member;

a support block defining a pair of threaded bores and rigidly connected to the camera support surface by bolts extending through the first slot and into the threaded bores, whereby the support block is selectively positioned along the first slot;

a pivot plate pivotally connected to the support block and defining a hole therethrough which receives a threaded bolt having a portion which includes an annular groove around a perimeter surface of the threaded bolt which extends outwardly from the pivot plate, the threaded bolt for engaging a threaded bore in a camera to be mounted to the elongate member; and further comprising a c-ring secured to the groove after the threaded bolt is received in the hole in the pivot plate, whereby the c-ring prevents the threaded bolt from being removed from the pivot plate;

means for locking the pivot plate in a selected angle relative to the support block, whereby the camera is selectively tilted for adjusting the angle of the camera view for recording images; and a plurality of brackets having bolts respectively received through the second slots for engaging a fastener, each bracket extending around a headrest support in the back of a seat of the automobile in which the camera mount is installed for rigidly connecting the elongated member thereto.

15. A camera mount for use in an automobile to support a camera for recording motion during operation of the automobile, comprising:

an elongated rigid member defining a camera support surface having an elongated first slot therein, said first slot extending along a line substantially parallel to a longitudinal axis of the member and a bracket mounting surface at an angle relative to the camera support surface;

a support block defining at least one threaded bore and rigidly connected to the camera support surface by at least one bolt extending through the first slot and into the threaded bore, whereby the support block is selectively positioned along the first slot;

a pivot plate pivotally connected to the support block;

means for securing a camera to the pivot plate;

means for locking the pivot plate in a selected angle relative the support block, whereby the camera is selectively tilted for adjusting the angle of the camera view for recording images;

at least one buckle attached to the rigid member; and at least one strap attached at a first end to the bracket mounting surface of the elongated member and being adapted for engagement to the buckle, for extending around a seat back and engaging the buckle whereby the elongate member is secured to the seat of the automobile in which the camera is to be installed.

16. The camera mount as recited in claim 15, further comprising at least one plate attached to the rigid member for bearing against the back of the seat to which the camera mount is connected.

17. The camera mount as recited in claim 15, wherein the means for securing a camera comprises a threaded bolt; and wherein the pivot plate defines a hole for receiving the threaded bolt for attaching the camera to the pivot plate.

18. The camera mount as recited in claim 17, wherein the threaded bolt defines an annular groove around a perimeter surface of the threaded bolt; and further comprising a c-ring secured to the groove after the threaded bolt is received in the hole in the pivot plate, whereby the c-ring prevents the threaded bolt from being removed from the pivot plate.

19. The camera mount as recited in claim 17, wherein the support block defines a second hole in substantial alignment with the hole in the pivot plate, for receiving an adjuster for rotating the threaded bolt in order to connect the camera thereto.

20. The camera mount as recited in claim 15, wherein the rigid member is an angle member.

21. The camera mount as recited in claim 15, further comprising means for adjusting the angle of pivot of the pivot block.

22. The camera mount as recited in claim 21, wherein the means for adjusting comprises:

the pivot plate defining a threaded bore;

a bolt received in the threaded bore, whereby the bolt, being screwed through the threaded bore, bears against an upper surface of the support block and thereby causes the angle between the pivot plate and the support block to change.

23. The camera mount as recited in claim 15, further comprising a resilient pad received on the pivot plate for cushioning the connection between the pivot plate and the camera.

24. The camera mount as recited in claim 15, wherein the support block is U-shaped in front plan view; and the pivot plate is U-shaped in front plan view, and disposed in inverted position matingly receives the support block, which support block and pivot plate are pivotally joined together for pivoting the pivot plate relative the support block, where the angle of the camera view is selectively adjustable.

25. The camera mount as recited in claim 24, wherein the pivot plate defines at least one arcuate slot for receiving a fastener therethrough; and wherein the support block further includes a securing member for receiving the fastener, whereby the pivot plate is pivoted as guided by the fastener in the arcuate slot to a selected angle and secured thereat by tightening the fastener in the securing member.

26. A method of securing a camera in an automobile for recording images during operation of the automobile, comprising the steps of:

(a) placing an elongated rigid member between a pair of headrest supports extending from seats of an automobile, the rigid member defining a camera support surface having an elongated first slot therein, said first slot extending along a line substantially parallel to a longitudinal axis of the member and a bracket mounting surface defining at least one pair of second slots coaxially aligned therein and spaced apart, said second slots extending along a second line substantially parallel to the longitudinal axis of the member;

(b) rigidly connecting the elongated member to the headrest supports in the seat of the automobile with brackets respectively extending through the second slots;

(c) attaching a support block to the camera support surface, the support block defining at least one threaded bore and rigidly connected to the camera support surface by at least one bolt extending through the first slot and into the threaded bore, whereby the support block is selectively positioned along the first slot;

(d) pivotally connecting a pivot plate to the support block, whereby said pivot plate is selectively tilted for adjusting the angle of the view of a camera connected thereto for recording images; and (e) locking the pivot plate in a selected angle relative the support block, whereby a camera, connected to the pivot plate, is selectively positioned in the automobile, for recording images.

27. A camera mount for use in an motor vehicle to support a camera for recording images from the motor vehicles, comprising:

an elongated rigid member for being attached to a seatback of a motor vehicle and having a camera support surface;

a pivot plate pivotally connected to the camera support surface;

means for securing a camera to the pivot plate;

means for locking the pivot plate at a selected angle relative the camera support surface, whereby the camera is selectively tilted for adjusting the angle of the camera view for recording images; and means for connecting opposing ends of the rigid member to respective seatbacks of the motor vehicle in which the camera mount is installed.

28. The camera mount as recited in claim 27, wherein the rigid member is an angle member.

29. The camera mount as recited in claim 27, wherein the means for connecting comprises:

the rigid member having a bracket mounting surface at an angle relative to the camera support surface; and bracket means operatively engaged to the bracket mounting surface for connecting each of said opposite ends of said rigid member to a headrest support in each of the seatbacks.

30. The camera mount as recited in claim 29, wherein the bracket means comprises the bracket mounting surface defining an opening therein; and a bracket that engages a respective one of the headrest supports;

a threaded member extending through the opening and engaged to the bracket; and a fastener received on the threaded member.

31. The camera mount as recited in claim 29, wherein the bracket means comprises a j-bolt having a portion extending around a respective one of the headrest supports and having a threaded end which extends through an opening in the bracket mounting surface; and a fastener received on the threaded member, whereby the rigid member is connected to the headrest support.

32. The camera mount as recited in claim 29, wherein the bracket means comprises:

a block defining a notch for receiving a portion of a respective one of the headrest supports; and a threaded connector extending through an opening in the bracket mounting surface and engaging the block; and a fastener attached to the connector, whereby the bracket means secures the rigid member to the respective headrest support.

33. The camera mount as recited in claim 27, wherein the pivot plate comprises:

a support adapted for being connected to the rigid member; and a plate member pivotally connected to the support for receiving the camera thereon.

34. The camera mount as recited in claim 33, wherein the support defines an opening for receiving a bolt for connecting the support to the camera support surface.

35. The camera mount as recited in claim 33, wherein the camera support surface defines a slot substantially parallel to the longitudinal axis of the rigid member; and further comprising a connector that extends through the slot and engages the support for selectively positioning the plate member longitudinally along the rigid member.

36. The camera mount as recited in claim 35, wherein the means for securing the camera to the pivot plate comprises a hole in the plate member for receiving a bolt for connecting a camera thereto.

37. The camera mount as recited in claim 27, wherein the means for connecting comprises at least one strap attached at a first end thereof to the elongated member and being adapted at a second end thereof for detachable engagement to a buckle attached to the elongated member, for extending around the seatback and engaging the buckle whereby the elongate member is secured to the seatback of the motor vehicle.

* * * * *